March 16, 1965 J. HARBIDGE 3,173,259
VEHICLE HYDRAULIC TRANSMISSION SYSTEMS
Filed July 10, 1964
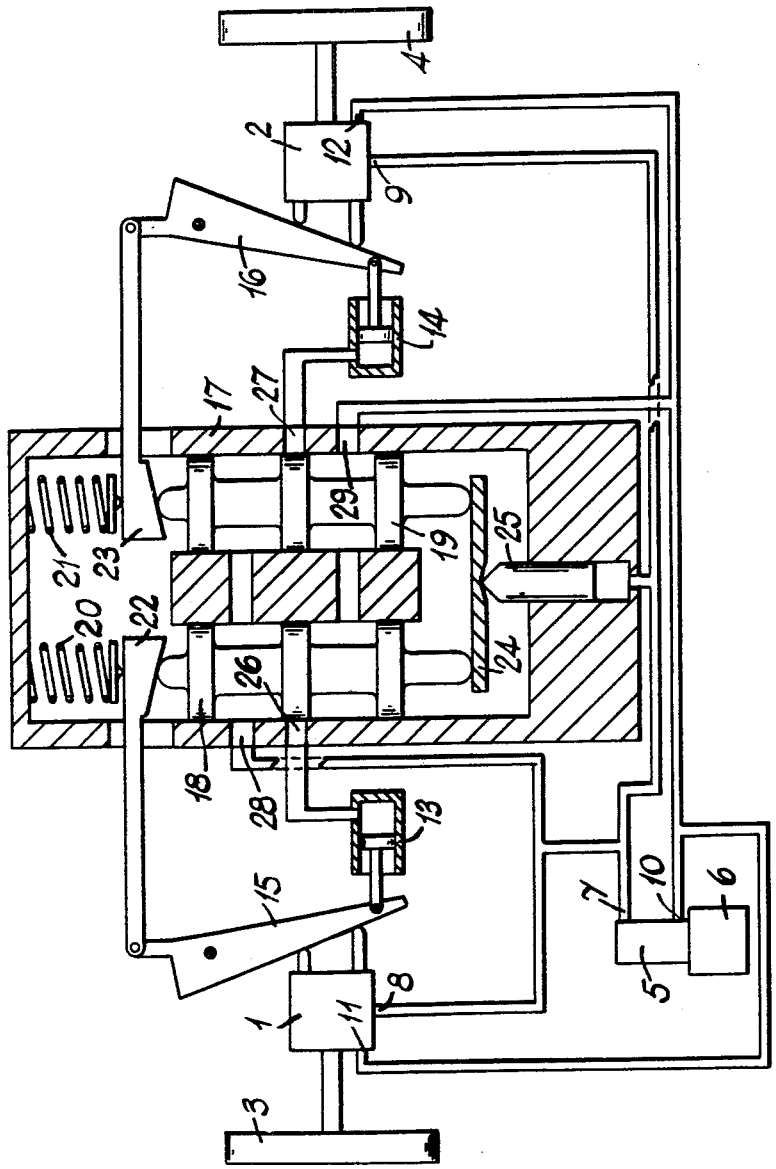

3,173,259
VEHICLE HYDRAULIC TRANSMISSION SYSTEMS
John Harbidge, Birmingham, England, assignor to Joseph
Lucas (Industries) Limited, Birmingham, England
Filed July 10, 1964, Ser. No. 381,755
2 Claims. (Cl. 60—53)

This invention relates to vehicle hydraulic transmission systems of the kind comprising a pair of variable stroke hydraulic motors for driving a pair of wheels of the vehicle respectively, and a pump for supplying motive fluid to the pair of motors respectively, the strokes of the motors being variable in response to changes in the pressure between the pump and motors.

The object of the invention is to provide in such a system means for maintaining the strokes of the pair of motors substantially equal.

Means according to the invention comprises in combination, a pair of servo-cylinders for controlling the strokes of the pair of motors respectively, a pair of spool valves for controlling the flow of fluid to and from said servo-cylinders respectively, the spools of said valves being disposed side-by-side in parallel relationship, a rockable member adapted to bear upon one pair of adjacent ends of the spools with a force dependent upon the pressure in the system between the pump and the pair of motors, a pair of springs urging the pair of spools respectively against said member, and a pair of wedges movable respectively by the pair of servo-cylinders between the pair of springs and the pair of spools the arrangement being such that in the event of the stroke of one motor becoming greater than the other the associated valve will be moved by its wedge piece to reduce the stroke of said one motor, whilst tending to cause the other valve to increase the stroke of said other motor.

Referring to the drawing, which is a part sectional view of a vehicle transmission system according to the invention there is provided a pair of hydraulic motors 1, 2, of the variable stroke swash plate type which are adapted to drive a pair of wheels 3, 4, at opposite sides of the vehicle. There is also provided a pump 5 adapted to be driven by the engine 6 of the vehicle and adapted to supply motive fluid to the pair of motors. The pump may be of the swash plate type and has its outlet 7 connected to the inlets 8, 9, of the motors 1, 2, respectively and its inlet 10 connected to the outlets 11, 12 of the motors 1, 2 respectively.

A pair of servo cylinders 13, 14 having pistons connected to the cam plates 15, 16 of the motors 1, 2 respectively are provided for varying the stroke of these motors. Moreover, a pair of spool valves are provided for controlling the flow of fluid to and from the pair of servo cylinders respectively. The pair of spool valves are conveniently mounted in a common body part 17 with the axes of the spools 18, 19 in parallel side-by-side relationship. The spools 18, 19 are urged in one direction by springs 20, 21 acting through wedge pieces 22, 23 movable laterally by the cam plates 15, 16 respectively. By means of the springs 20, 21 the spools are held in contact with opposite end portions of a floating member 24 against the middle portion of which bears a plunger 25 which is subject to the outlet pressure of the pump.

The valves have ports 26, 27 which are connected to the servo cylinders 13, 14 respectively. When the spools are in a position of equilibrium the ports 26, 27 are covered and flow of fluid to or from the servo cylinders is prevented. However, movement of one of the spools by the springs will place the associated port in communication with a port 28 which is subject to the fluid pressure at the outlet of the pump. Furthermore, movement of one of the spools from its position of equilibrium in the opposite direction against the action of its spring will place the associated port in communication with a port 29 which is subject to the fluid pressure at the inlet 10 of the pump.

In operation, when the strokes of both motors are equal and the load on the wheels is constant the spools 18, 19 will be in a position to cover the ports 26, 27. However, in the event of the load on the wheels increasing, with a consequential increase in the pressure at the pump outlet, the plunger 25 will move both spools equally against the action of their springs so as to place the servo cylinders 13, 14 in communication with the port 29. As a result the cam plates 15, 16 will move in a direction to increase the stroke of the motors thereby reducing the overall speed ratio between the vehicle engine 6 and the wheels. Conversely in the event of the load at the driven wheels being reduced the two spools will be moved in the opposite direction to increase the pressure in the servo cylinders and thereby reduce the obliquity of the cam plates to increase the overall speed ratio between the engine and driven wheels. Should the stroke of one motor, for example motor 1, increase relative to the stroke of the other then the wedge piece 22 will be moved laterally between the spring 20 and the spool 18 so as to move this spool in a direction to increase the pressure in the servo cylinder 13. This movement of the spool 18 will cause the member 24 to rock upon the plunger 25 so as to increase the pressure of the member on the spool 19 which therefore tends to move in a direction to increase the stroke of the motor 2 until both motors again have a similar stroke and the spools both reassume a position of equilibrium.

Having thus described my invention what I claim as new and desire to secure by Letters Patent is:

1. A vehicle hydraulic transmission system of the kind specified comprising in combination, a pair of servo-cylinders for controlling the strokes of the pair of motors respectively, a pair of spool valves for controlling the flow of fluid to and from said servo-cylinders respectively, the spools of said valves being disposed side-by-side in parallel relationship, a rockable member adapted to bear upon one pair of adjacent ends of the spools with a force dependent upon the pressure in the system between the pump and the pair of motors, a pair of springs urging the pair of spools respectively against said member, and a pair of wedges movable respectively by the pair of servo-cylinders between the pair of springs and the pair of spools, the arrangement being such that in the event of the stroke of one motor becoming greater than the other, the associated valve will be moved by its wedge piece to reduce the stroke of said one motor, whilst tending to cause the other valve to increase the stroke of said other motor.

2. A vehicle hydraulic transmission system as claimed in claim 1 wherein the motors are of the swash plate type and each has connected to its cam plate the piston of the associated servo-cylinder and the associated wedge.

No references cited.

JULIUS E. WEST, *Primary Examiner.*